March 14, 1967 T. G. BELT ET AL 3,309,594

POWER CONTROL CIRCUIT FOR SERIES MOTORS

Original Filed Aug. 22, 1960

THOMAS G. BELT
JEARLD L. HUTSON
INVENTORS

BY [signature]
ATTORNEY

United States Patent Office 3,309,594
Patented Mar. 14, 1967

3,309,594
POWER CONTROL CIRCUIT FOR SERIES MOTORS

Thomas G. Belt, Garland, and Jearld L. Hutson, Richardson, Tex., assignors to Texas Instruments Incorporated, Dallas, Tex., a corporation of Delaware Original application Aug. 22, 1960, Ser. No. 50,995, now Patent No. 3,194,973, dated July 13, 1965. Divided and this application May 21, 1965, Ser. No. 477,989
2 Claims. (Cl. 318—246)

This application is a division of our copending application Ser. No. 50,995 filed Aug. 22, 1960, and now Patent No. 3,194,973.

The present invention relates to the control of power and more particularly to a novel circuit for controlling the flow of current through a load by utilizing a thyratron type device.

In many applications it is desirable to vary the amount of power supplied to a load from zero to maximum power. One such application is in the field of variable intensity lighting wherein the intensity of light provided is varied by varying the amount of power supplied to the light source. A very similar application is that of control of electric heaters or A.C. machinery.

The power referred to above is, of course, the R.M.S. (root mean square) power. Thus, it is known that the power supplied to a load can be controlled by controlling the magnitude of the current passing through a load by, for example, a variable transformer or resistive network. A second method for controlling the power supplied to a load is to control the wave shape of the current applied to the load. Thus, by controlling the portion of individual cycle in which current is applied to a load it is possible to control the R.M.S. power supplied to this load.

Many circuits have been devised in the prior art that utilize thyratron type switches to control the power supplied to a load by controlling the portion of a cycle in which current is allowed to flow. These circuits are exemplified by those shown at pages 314 through 316 with the handbook, Reference Data for Radio Engineers, fourth edition, copyrighted by International Telephone and Telegraph Corp., and printed by American Book-Stratford Press, Inc., New York, New York.

All of the circuits shown have several common features. First, the thyratron type switch is placed in the load circuit. The power can flow through the load only at those times which the switch is conducting. Second, either an RC or RL network is used to provide a varying amount of phase shift between the grid and the anode it is possible to control the thyratron to allow conduction only during a certain portion of each cycle thereby controlling the power to the load. In all cases it is necessary to use a center tapped transformer to achieve the desired phase shift between the grid and the plate of the thyratron. Fourth, the power supplied to the load is only a half wave power, unless two stages are used in push-pull operation or a bridge type system is utilized.

Needless to say, the control circuits using thyratron type switches have been accorded widespread acceptance in the power control field. These circuits permit large amounts of power to be handled with smooth and stable control of current and permit the control of short circuit currents through the load by the automatic interruption of the rectifier output for sufficient time to permit short circuit arcs to clear followed by immediate reapplication of voltage. Because of this extensive use, the need for a circuit that requires fewer components than the prior art circuits is readily evident. This is especially true if the components eliminated are the larger and more expensive components, such as a transformer.

The present invention provides such a circuit. The present circuit effectively controls the conduction of a thyratron type switch without the requirement for actually producing a phase shift between the anode and the grid, thereby eliminating the need for a center tapped transformer. This is accomplished by using a combination of resistors, and a capacitor to produce an apparent change in the phase of the current applied to the control electrode of the thyratron type switch, thereby controlling the conduction through the switch from zero to full conduction during a half cycle.

The present invention also provides full wave control without the necessity for utilizing either a push-pull or a bridge type system. The circuit is compact and operates at an extremely high efficiency. The cost of the system is minimized due to the decrease in the number of components required, and especially due to the elimination of the transformer.

It is therefore one object of the present invention to provide a novel circuit for controlling power through any combination of inductive, capacitive, or resistive loads.

Another object of the present invention is to provide a power control circuit utilizing a thyratron type switch which does not require actual phase shift between the anode and the control electrode of the device.

Another object of the present invention is to provide a thyratron type power control circuit in which full wave control can be obtained without resorting to push-pull or bridge type circuits.

Still another object of the present invention is to provide a power control circuit that exhibits "servo" action.

These and many other objects of the present invention will become more readily apparent as the following description of the invention unfolds when taken in conjunction with the appended drawings which:

Figure 1:
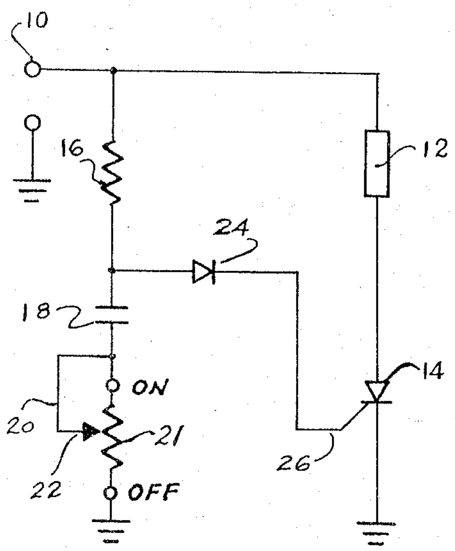
FIGURE 1 is a schematic illustration of the circuit of the present invention adapted for half wave power control.

Referring now to FIGURE 1 of the drawings, the reference numeral 10 is used to denote the input terminal at which power is applied to the load circuit of the present invention. The input terminal 10 is connected through a load 12 and a thyratron type switch 14 to ground. In this particular embodiment of the invention a four-layer solid state device is used as the thyratron type switch device 14.

One end of a resistor 16 is also connected to input terminal 10. The other end of the resistor 16 is connected to ground through a capacitor 18 and a variable resistor 20. The variable resistor 20 comprises a resistive portion 21 and a slider 22. The junction between the resistor 16 and capacitor 18 is connected through the diode 24 to the gate 26 of thyratron type device 14.

The manner in which the circuit of FIGURE 1 functions to provide half wave control of power will now be described with reference to FIGURES 1 and 3. The condition in which the slider 22 is connected to ground, the off-position for the circuit, will be discussed first. When the negative portion of a sine wave is applied to the input 10, no power will be supplied to the load 12 as a positive pulse is necessary for the thyratron type switch 14 to conduct.

However, the capacitor 18 will be charged to a potential depending upon the ratio of the reactance of the capacitor 18 to the resistance of the resistor 16. This is perhaps best seen with reference to FIGURE 3 wherein Curve A illustrates the potential of the sine wave voltage applied to the input terminal 10 and the Curve B represents the charge on the capacitor 18 with the variable resistor 20 set at zero resistance. It is to be observed that due to the RC time constant of the circuit, the charge on the capacitor 18 (Curve B) continues to increase until such time as the input potential is equal to or less than the charge on the capacitor rather than follow the curve of the input potential.

For the switch 14 to fire it is necessary that a positive pulse be applied to the anode of the device and also that a positive pulse be applied to the control electrode 26. The positive potential $V_c$ shown in FIGURE 3 represents the potential necessary at the control electrode 26 to cause the thyratron type device to begin conducting. It must be recognized that current is necessary to trigger the solid state device, but in any event this potential must be present. Thus, it is necessary for the capacitor 18 to be completely discharged from the negative direction and charged slightly positive before the thyratron device 14 will be triggered. Referring again to FIGURE 3, and more particularly to Curve B, it is seen that with the variable resistor 20 in the off-position the potential at the capacitor 18 will never be of a positive value sufficient to cause the switch 14 to fire, and no current will flow through the load.

Figure 3:
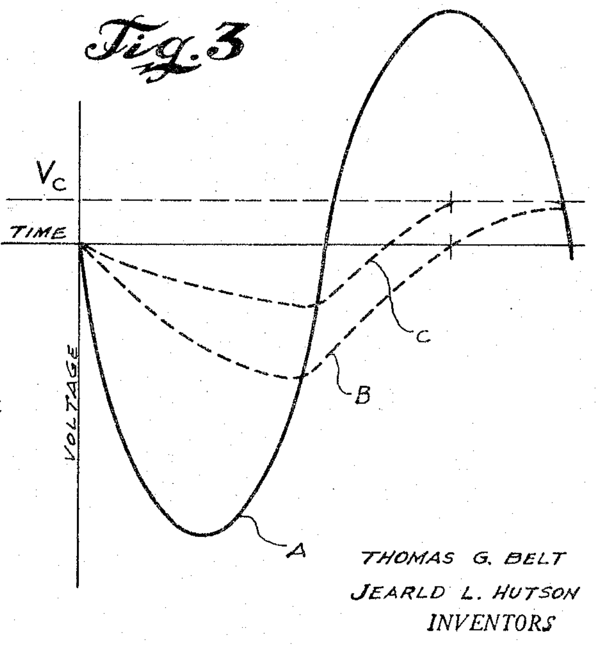
FIGURE 3 is a graphical representation showing the manner in which the charge on the capacitor varies as the phase of the input signal varies.

Curve C in FIGURE 3 shows the charge appearing on the capacitor 18 when the variable resistor 20 provides a certain amount of resistance between the capacitor 18 and ground. As seen from Curve C, the capacitor 18 is not charged to as high a potential and the discharge and charge time of the capacitor 18 is such that the thyratron type switch 14 will conduct for approximately one quarter of a cycle.

When the variable resistor 20 is in the on-position, preferably an infinite amount of resistance is between the capacitor 18 and ground, but at least sufficient resistance to prevent any appreciable charging of the capacitor 18. In this instance the thyratron 14 will fire soon after the positive portion of the sine wave has reached the critical voltage $V_c$ and, therefore, current would flow through the load for virtually the full one-half cycle.

Referring again to FIGURE 1, it is seen that a diode 24 is placed in the circuit connecting the capacitor 18 to the control electrode 26 of the switch 14. This diode 24 is not a necessary portion of the circuit but is considered desirable in that it reduces the normally high leakage current that flows through the gate-cathode diode of the switch 14. The diode 24 will be necessary, of course, if the negative potential established on the capacitor 18 exceeds the reverse breakdown voltage of the gate-cathode diode of the switch 14.

Figure 2:
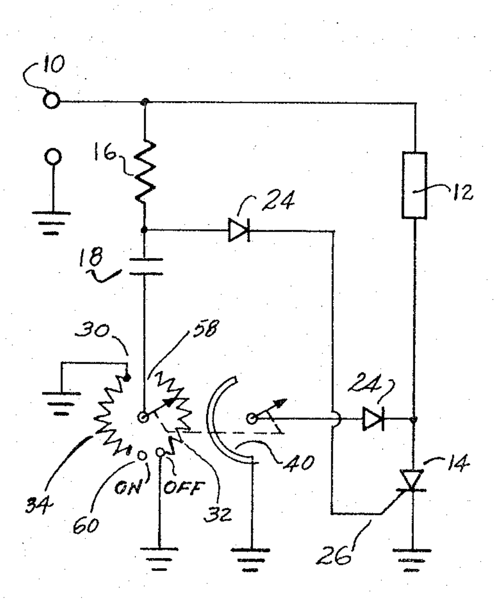
FIGURE 2 is a schematic illustration of a second embodiment of the present invention adapted to provide full wave control of power.

In FIGURE 2 there is shown a second embodiment of the present invention which provides full wave control of the current flowing through the load without resorting to push-pull or bridge type circuitry. The circuit is quite similar to that of FIGURE 1 and like reference characters have been used to denote like parts. Referring now to FIGURE 2, it is seen that the variable resistor 30 of FIGURE 2 comprises two separate resistive portions 32 and 34 and a single slider 36. One end of resistor 34 and one end of resistor 32 are connected to the ground. Two regions, 58 and 60, having an infinite, or at least very high, resistance to ground are also provided.

The junction between the load 12 and the switch 14 is connected through the rectifier 38 and the switch 40 to ground. The arm on the switch 40 is mechanically connected to the slider 36 such that the switch 40 will be open at all times except when the slider 36 is contacting either the resistor 34 or region 60.

The operation of the circuit shown in FIGURE 2 is similar to that shown in FIGURE 1. With the slider 36 in the off-position the capacitor 18 will be connected directly to ground. When the negative portion of a sine wave supplied to the input terminal 10 the switch 14 will not fire as mentioned before and the capacitor 18 will be charged in the manner described above. Current will not flow through the rectifier 38 during any portion of a cycle because the switch 40 is open.

As the slider 36 of the variable resistor 30 is moved along the resistor 32 introducing resistance between the capacitor 18 and ground, the switch 14 will begin to conduct for a portion of each cycle, as described before. When the slider 36 contacts the region 58 placing a very high resistance in the charge circuit of capacitor 18, the switch 14 will be conducting for substantially one-half of a cycle. At the time the slider 36 first contacts the resistor 34, the switch 40 will be conducting for substantially one-half of a cycle. At the time the slider 36 first contacts the resistor 34 the the switch 40 will be closed. When this happens the power will be applied to the load 12 during all of the negative half cycle by conduction through the rectifier 38 and the switch 40 (now closed) to ground. The switch 14 will, however, be cut off at all times as the capacitor 18 is now connected directly to the ground.

To further increase the power flowing through the load 12 the slider 36 is moved still further to place a portion of the resistor 34 between capacitor 18 and ground. This performs the same function as placing a portion of the variable resistor 20 in the capacitor circuit of FIGURE 1 and once again causes the switch 14 to conduct during a portion of each positive cycle. At such time as the slider 36 has reached the region 60 of high resistance to ground, the switch 14 will again be conducting during virtually all of the positive cycle.

It has been found that a certain amount of servo action is possible with the circuit in that if the input voltage is decreased the capacitor 18 will be charged to a slightly lower level. However, the decrease in input voltage will increase the time required for the capacitor causing the switch 14 to conduct for a smaller portion of the cycle. This feature of the invention increases the utility of the circuit in that it makes the circuit much more effective in such uses as, for example, the speed controller for a series wound motor shown in FIGURE 4.

Figure 4:
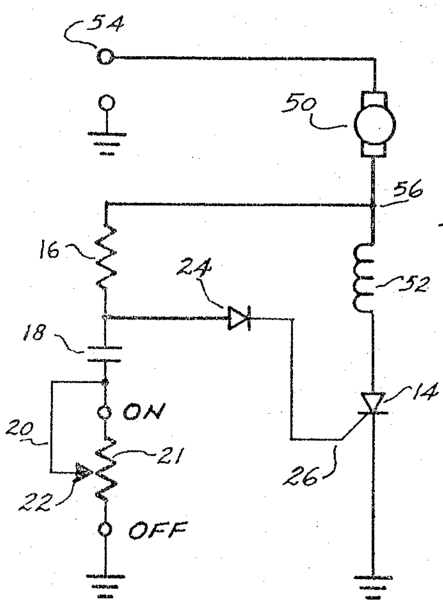
FIGURE 4 is a schematic illustration showing the manner in which the present invention can be utilized to control the speed of a series wound motor.

Referring to FIGURE 4, it is identical to FIGURE 1 except that the field coil 52 of the series wound motor serves as the load 12 of FIGURE 2. The input of the inventive circuitry is the output of the armature winding 50 of the previously mentioned motor.

In operation, assume that a constant input voltage is applied to the input terminal 54 of the motor and that the speed of the motor is set by adjusting the variable resistor 20. As explained earlier, the setting of the variable resistor 20 will control the current passing through the switch 14, and hence the speed of the motor. For any particular speed of the motor a certain back E.M.F. will be generated across the armature winding of the motor. The potential at point 56, the input of the inventive circuitry, will be the algebraic sum of the input voltage at input terminal 54 and the back E.M.F. generated by the armature 50. As the speed of the motor increases due to a change in load, the back E.M.F. will increase thereby decreasing the potential at the input the inventive circuitry. Due to the decrease in potential, the capacitor 18 will not be charged to as high an initial value, but also will not be discharged and recharged so fast thereby decreasing the portion of the cycle during which the switch 14 will conduct. The decrease in the conduction time of the switch 14 will decrease the power applied to the motor thereby decreasing the speed until the desired speed is reached.

On the other hand if the load increases, decreasing the speed of the motor to less than that desired, the back E.M.F. will be less thereby increasing the potential at point 56, input of the inventive circuitry. When this happens the capacitor 18 will be charged to a slightly greater value. However, the increase in potential at point 56 is more than enough to offset the slight increase in charge of the capacitor by discharging and charging capacitor 18 at a faster rate, thereby causing the switch 14 to conduct for a greater portion of the cycle. Because of the greater amount of power applied to the motor it will increase its speed until the original desired speed has been attained. It is to be noted that if the resistor 16 were connected to input terminal 54, speed control would be achieved, but that the servo action in response to change in load would not be present. Also, full wave control could be used but the servo effect would not be as great.

The parameters of the components used in the circuit have not been found to be critical. Ideally, the resistors which comprise the variable resistors 20 and 30 should be variable from zero to infinity. As a practical matter, it has been found suitable to use a resistance variable over the range of from zero to 20,000 ohms for each portion. Also, an ordinary centertapped variable resistor will serve as the variable resistor 30 if the resistance of the lower half is sufficiently high to prevent substantial current flow through the rectifier 38 when switch 40 is open. Of course, it would be necessary to connect the center tap to ground through the switch 40 and mechanically connect the slider to the switch such that the switch is closed only when the silicon contacts the center tap and the portion of the resistor tied to the capacitor. It is to be noted that the change in conduction is not linear with a change in resistance. A capacitance of from 3 to 5 microfarads and a resistance of 10,000 ohms for capacitor 18 and resistor 16, respectively, have provided very satisfactory results.

The invention has been described with reference to a solid state thyratron type switch in which current flowing through the device triggers the device on. Obviously the invention would be equally applicable to a gas filled, grid controlled, vacuum tube or other similar device.

Although the invention has been described with reference to a particular embodiment, it will be clear that many variations in the details of the construction specifically illustrated and described may be resorted to without departing from the true spirit and scope of the invention as defined in the appended claims.

What is claimed is:

1. A circuit for controlling the speed of a motor having series connected armature and field windings comprising:

(1) a pair of input terminals adapted to be connected to a source of alternating current voltage;

(2) a thyratron type device having an anode, a cathode and a gate;

(3) electrical lead means connecting said series connected armature and field windings in series circuit with said input terminals and said anode and cathode;

(4) resistive means electrically connected to the junction between the field winding and armature winding of said motor;

(5) capacitive means electrically connected in circuit with said resistive means;

(6) means connected in circuit with said capacitive means for varying the charging rate of said capacitive means; and (7) means electrically connecting said capacitive means with said gate whereby the firing angle of said thyratron type switch is controllable over essentially the full positive half cycle of the voltage applied to said input terminals.

2. A circuit as in claim 1 wherein said thyratron type switch is a four layer solid state device and wherein said resistive means, said capacitive means, and said means connected in circuit with said capacitive means for varying the charging rate of said capacitive means are connected in series circuit.

References Cited by the Examiner

UNITED STATES PATENTS

| | | | |
|---|---|---|---|
| Re. 25,203 | 7/1962 | Momberg et al. | 318—246 |
| 2,939,064 | 5/1960 | Momberg et al. | 318—246 |
| 2,981,879 | 4/1961 | Taylor et al. | 318—345 X |
| 2,981,880 | 4/1961 | Momberg et al. | 318—246 |
| 3,141,429 | 7/1964 | Momberg et al. | 318—246 X |

ORIS L. RADER, *Primary Examiner.*

J. C. BERENZWEIG, *Assistant Examiner.*